(12) United States Patent
Gollapudi et al.

(10) Patent No.: US 9,053,208 B2
(45) Date of Patent: Jun. 9, 2015

(54) FULFILLING QUERIES USING SPECIFIED AND UNSPECIFIED ATTRIBUTES

(75) Inventors: Sreenivas Gollapudi, Cupertino, CA (US); Sayan Bhattacharya, Durham, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 13/038,409

(22) Filed: Mar. 2, 2011

(65) Prior Publication Data
US 2012/0226679 A1 Sep. 6, 2012

(51) Int. Cl.
*G06F 17/30* (2006.01)

(52) U.S. Cl.
CPC .................. *G06F 17/30958* (2013.01)

(58) Field of Classification Search
USPC .............................. 707/719; 703/2
See application file for complete search history.

(56) References Cited

U.S. PATENT DOCUMENTS

| | | | |
|---|---|---|---|
| 7,047,169 B2 * | 5/2006 | Pelikan et al. ............... | 703/2 |
| 7,584,159 B1 * | 9/2009 | Chakrabarti et al. ......... | 706/45 |
| 8,260,771 B1 * | 9/2012 | Ortega et al. ............... | 707/723 |
| 8,380,583 B1 * | 2/2013 | Chanda ....................... | 705/26.7 |
| 2007/0208730 A1 | 9/2007 | Agichtein et al. | |
| 2008/0033939 A1 | 2/2008 | Khandelwal | |
| 2008/0183685 A1 | 7/2008 | He et al. | |
| 2010/0191768 A1 | 7/2010 | Malpani et al. | |
| 2010/0223266 A1 | 9/2010 | Balmin et al. | |

OTHER PUBLICATIONS

Beitzel, et al., "Automatic Web Query Classification Using Labeled and Unlabeled Training Data", Retrieved at << http://citeseerx.ist.psu.edu/viewdoc/download?doi=10.1.1.64.5957&rep=rep1&type=pdf >>, The 28th ACM/SIGIR International Symposium on Information Retrieval, Aug. 15-19, 2005, pp. 2.

Akshay, et al., "Optimizing Web Search Engines Performance by User Feedback", Retrieved at << ibacnet.org/bai2007/proceedings/Papers/2007bai7237.doc >>, 2007, pp. 12.

Gollapudi, et al., "An Axiomatic Approach for Result Diversification", Retrieved at << http://www2009.org/proceedings/pdf/p381.pdf >>, The 18th International World Wide Web Conference, Apr. 20-24, 2009, pp. 381-391.

(Continued)

*Primary Examiner* — Rehana Perveen
*Assistant Examiner* — Hung Havan
(74) *Attorney, Agent, or Firm* — Steve Wight; Judy Yee; Micky Minhas (57) ABSTRACT

A query is received and processed to determine one or more specified and unspecified attributes in the query. The specified and unspecified attributes may correspond to attributes of one or more items. A graph is generated for the items and includes a node for each item and an edge between each unique pair of nodes. Each node is assigned a cost based on a distance between the specified attributes of the query and the attributes of the item associated with the node. Each edge is assigned a weight based on a distance between the unspecified attributes associated with the nodes of the node pair corresponding to the edge. A set of nodes from the graph is selected by minimizing a total cost of the nodes while maximizing a dispersion of the nodes based on the edge weights.

15 Claims, 5 Drawing Sheets

(56) References Cited

OTHER PUBLICATIONS

Kim, et al., "Intelligent Product Information Search Framework Based on the Semantic Web", Retrieved at << http://citeseerx.ist.psu.edu/viewdoc/download?doi=10.1.1.106.6927&rep=rep1&type=pdf >>, 2004, pp. 1-4.

Mehta, et al., "Price Uncertainty and Consumer Search: A Structural Model of Consideration Set Formation", Retrieved at << http://bear.warrington.ufl.edu/centers/mks/appendices/Price%20Uncerainty%20and%20Consumer%20Search.pdf >>, Marketing Science, vol. 22, No. 1, Jan. 2003, pp. 27.

Chekuri, et al., "A PTAS for the Multiple Knapsack Problem", Retrieved at << http://repository.upenn.edu/cgi/viewcontent.cgi?article=1215&context=cis_papers >>, 1999, pp. 1-19.

Panigrahi, et al., "Result Enrichment in Commerce Search using Browse Trails", Retrieved at << people.csail.mit.edu/debmalya/papers/manuscript-browsetrails.pdf >>, Proceedings of the Fourth International Conference on Web Search and Web Data Mining, WSDM, Feb. 9-12, 2011, pp. 10.

"Product Similarity Measure", U.S. Appl. No. 12/634,748, filed Dec. 10, 2009, pp. 1-22.

Agrawal, et al., "Diversifying Search Results", Retrieved at << http://research.microsoft.com/pubs/73931/diversifying-wsdm09.pdf >>, Second ACM International Conference on Web Search and Web Data Mining, Feb. 9-11, 2009, pp. 10.

Bhaskara, et al., "Detecting High Log-Densities—an O(n1/4) Approximation for Densest k-Subgraph", Retrieved at << http://arxiv.org/PS_cache/arxiv/pdf/1001/1001.2891v1.pdf >>, Proceedings of the 42nd ACM Symposium on Theory of Computing, 2010, pp. 24.

Birnbaum, et al., "An Improved Analysis for a Greedy Remote-clique Algorithm using Factor-revealing LPs", Retrieved at << http://citeseerx.ist.psu.edu/viewdoc/download;jsessionid=B95FE9F631FB55B244FE28414188BOCE?doi=10.1.1.100.5813&rep=rep1&type=pdf >>, Algorithmica, vol. 55, No. 1, May 2009, pp. 1-16.

Carbonell, et al., "The Use of MMR, Diversity-based Reranking for Reordering Documents and Producing Summaries", Retrieved at <<http://www.cs.cmu.edu/~jgc/publication/The_Use_MMR_Diversity_Based_LTMIR_1998.pdf >>, 21st Annual ACM/SIGIR International Conference on Research and Development in Information Retrieval, Aug. 24-28, 1998, pp. 335-336.

Chen, et al., "Less is More: Probabilistic Models for Retrieving Fewer Relevant Documents", Retrieved at <<http://people.csail.mit.edu/harr/papers/sigir2006.pdf >>, The 29th Annual International SIGIR Conference, Aug. 6-10, 2006, pp. 8.

Hassin, et al., "Approximation Algorithms for Maximum Dispersion", Retrieved at << http://www.shlomir.com/papers/dispersion.pdf >>, Operations Research Letters, vol. 21, No. 3, Oct. 1997, pp. 133-137.

Radlinski, et al., "Learning Diverse Rankings with Multi-armed Bandits", Retrieved at << http://www.cs.cornell.edu/~rdk/papers/icml08.pdf >>, The 25th Annual International Conference on Machine Learning held in conjunction with the 2007 International Conference on Inductive Logic Programming, Jul. 5-9, 2008, pp. 8.

Vee, et al., "Efficient Computation of Diverse Query Results", Retrieved at << http://infolab.stanford.edu/~usriv/papers/diversity.pdf >>, 24th International Conference on Data Engineering, 2008, pp. 10.

Zhai, et al., "Beyond Independent Relevance: Methods and Evaluation Metrics for Subtopic Retrieval", Retrieved at << http://citeseerx.ist.psu.edu/viewdoc/download?doi=10.1.1.14.6643&rep=rep1&type=pdf >>, The 26th ACM/SIGIR International Symposium on Information Retrieval, Jul. 28-Aug. 1, 2003, pp. 8.

Zhai, et al., "A risk minimization framework for information retrieval", Retrieved at << http://citeseerx.ist.psu.edu/viewdoc/download?doi=10.1.1.78.1778&rep=rep1&type=pdf >>, Information Processing and Management: an International Journal—Special issue: Formal methods for information retrieval, vol. 42, No. 1, Jan. 2006, pp. 31-55.

\* cited by examiner

FULFILLING QUERIES USING SPECIFIED AND UNSPECIFIED ATTRIBUTES

BACKGROUND

Millions of users submit queries to search engines and provider or merchant websites every day. Often the users are looking for information that is stored using data formats with well defined attributes such as structured data. Many merchants and providers store information about their products and services as structured data, with tables of attributes having various values associated with the products and services. Examples of structured data include product catalogs, travel databases about hotels, airlines or rental cars databases, and image databases.

While storing information as structured data may make it easier to use the data to populate webpages, catalogs, or to generate reports, the use of structured data may cause problems with respect to traditional keyword based methods for fulfilling queries. In particular, users may generate queries that include features that map only to a subset of the available attributes for a product. For example, a user may submit the query "Nikon Digital Camera." The query terms "Nikon" and "Digital Camera" can be mapped to attributes associated with product type and brand. However, other attributes associated with the structured data such a color, price, and megapixels have no corresponding mapping in the query. One solution is to fulfill the query using only the mapped attributes and ignore attributes that have not been mapped. However, such a solution may lead to a diminished search experience for a user.

SUMMARY

A query is received and processed to determine one or more specified and unspecified attributes in the query. The specified and unspecified attributes may correspond to attributes of one or more items. A graph is generated for the items which includes a node for each item and an edge between each unique pair of nodes. Each node is assigned a cost based on a distance between the specified attributes of the query and the attributes of the item associated with the node. This cost can be viewed as the irrelevance of the search result with respect to the user query. Each edge is assigned a weight based on a distance between the unspecified attributes associated with the nodes of the node pair corresponding to the edge. A set of nodes from the graph is selected by minimizing a total cost of the nodes while maximizing a dispersion of the nodes based on the edge weights. Identifiers of the items in the selected set are sent to a user who sent the query. The attribute space in which all the queries and products reside as well as the distance function used to determine the distance between different attribute values may have been initially provided, e.g. by an administrator.

In an implementation, a query is received at a computing device through a network. One or more specified attributes and unspecified attributes are determined from the received query by the computing device. Identifiers of a plurality of items are received by the computing device. Each item is associated with one or more attributes. A subset of the items is selected from the plurality of items based on the attribute(s) associated with each item and the specified attribute(s) and unspecified attribute(s) from the received query by the computing device. Identifiers of the items in the subset of the items are provided by the computing device through the network.

In an implementation, one or more specified attributes and unspecified attributes are received at a computing device. Identifiers of items are received at the computing device. Each item is associated with one or more attributes. A node is generated for each item by the computing device. For each node, a cost is associated with the node based on a distance between the attributes of the item associated with the node that match the specified attributes. For each pair of nodes, an edge is generated between the nodes in the pair of nodes. For each edge, a weight is associated with the edge based on a distance between the attributes of the items associated with each node of the pair of nodes corresponding to the edge that match the unspecified attributes. A subset of nodes is selected from the nodes using a function that minimizes the total cost of the nodes in the subset while maximizing a total dispersion of the nodes in the subset based on the weights associated with the edges between the nodes in the subset. Indicators of the items corresponding to the items associated with the nodes in the selected subset are provided.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
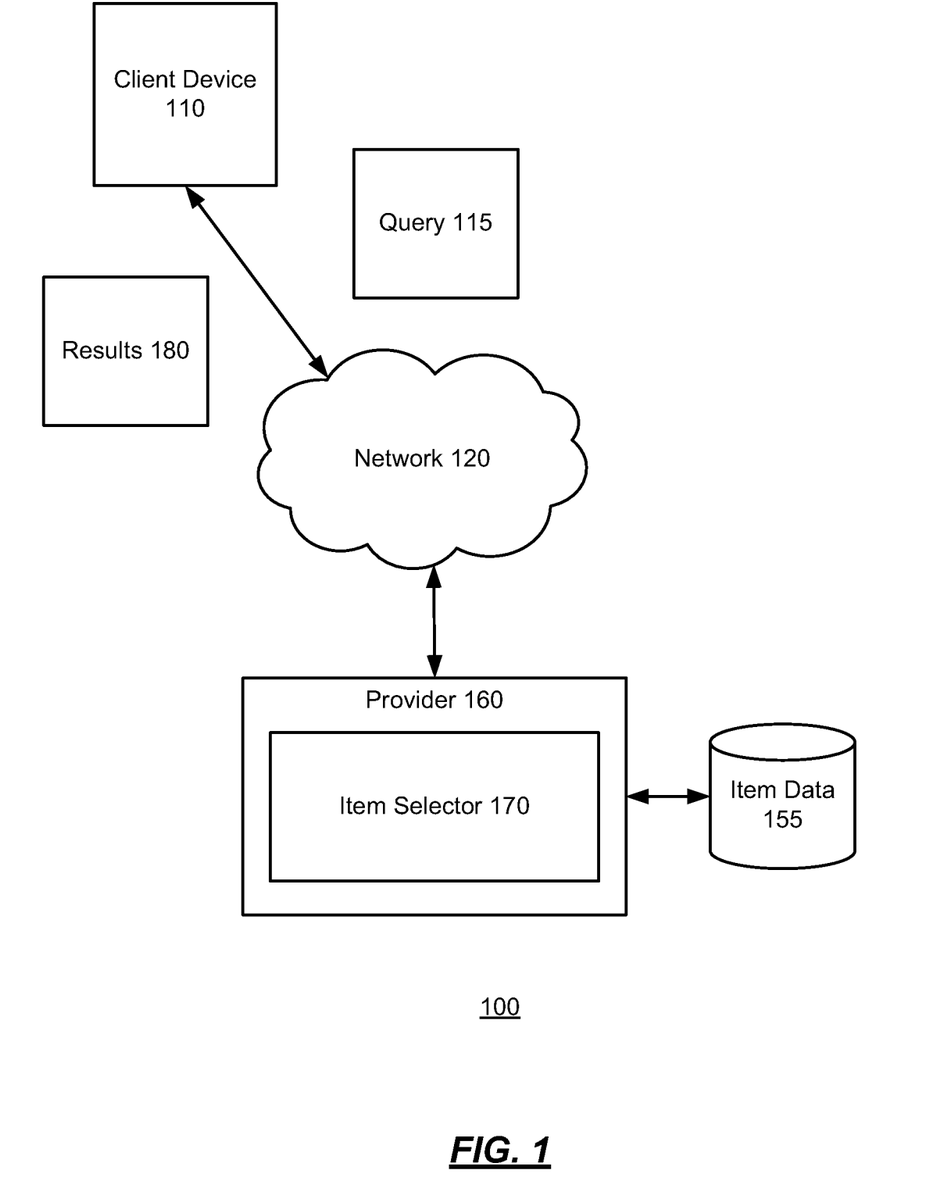
FIG. 1 is an illustration of an exemplary environment for providing identifiers of items in response to a query.

FIG. 1 is an illustration of an exemplary environment 100 for providing identifiers of items in response to a query. A client device 110 may communicate with one or more providers 160 through a network 120. The client device 110 may be configured to communicate with the providers 160 to access, receive, retrieve, and display media content and other information such as webpages and websites. The network 120 may be a variety of network types including the public switched telephone network (PSTN), a cellular telephone network, and a packet switched network (e.g., the Internet).

Figure 5:
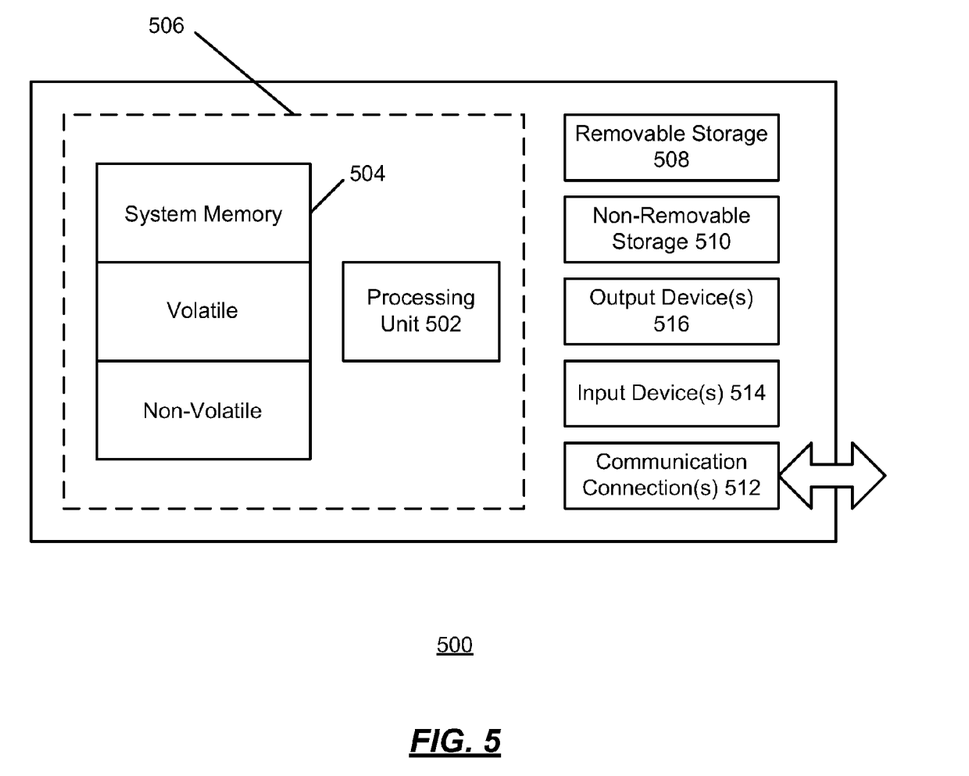
FIG. 5 shows an exemplary computing environment in which example embodiments and aspects may be implemented.

In some implementations, the client device 110 may include a desktop personal computer, workstation, laptop, PDA, smartphone, cell phone, or any WAP-enabled device or any other computing device capable of interfacing directly or indirectly with the network 120, such as the computing device 500 described with respect to FIG. 5. The client device 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client device 110 to access, process, and view information and pages available to it from the provider 160.

The provider 160 may be a server hosting a website that allows users to search for and view available items such as consumer products and services. For example, the provider 160 may host a website of a camera retailer and users may browse and search for cameras available for sale by providing a query 115 to the provider 160 and receiving identifiers of items matching the query 115 from the provider 160 such as products. Other types of retailers may also be associated with the provider 160.

In some implementations, the provider 160 may access and store item data 155. The item data 155 may include data representing a variety of products and services. In some implementations, the item data 155 may include one or more structured data tuples. Each structured data tuple may include one or more attributes, and each attribute may have one or more associated values. Other types of data structures or data types may be used by the item data 155. In some implementations, the item data 155 may include identifiers of items along with metadata or tags corresponding to one or more attributes and attribute values.

For example, a provider 160 may be a shoe retailer and each shoe may have one or more attributes that describe the qualities and characteristics of the shoe. Typical attributes associated with the shoe may include "color", "size", "width", "style", "price", etc.

Further, each shoe may have one or values associated with one or more of the attributes. Because every attribute may not be applicable to each shoe, each attribute may not have a corresponding value for each product. In some implementations, each product and its associated attributes may be implemented as a table. However other data structures may be used. An example product attribute table for five shoes is shown in Table 1:

TABLE 1

| Shoe ID | TYPE | Color | SIZES | PRICE |
|---|---|---|---|---|
| 1 | SHOE | RED | W7-12 | $100 |
| 2 | BOOT | BLACK | M8-15 | $50 |
| 3 | SHOE | BLUE | M8-12 | $60 |
| 4 | SHOE | GREEN | W6-9 | $99 |

The provider 160 may further include an item selector 170. The item selector 170 may receive a query 115 from a user of the client device 110, and may select one or more items from the item data 155 to provide to the user. The item selector 170 may then provide identifiers of the selected one or more items to the user. The identifiers may be provided as results 180. The results 180 may be implemented as, or comprised within, a webpage, for example. The item selector 170 may be implemented using one or more general purpose computing devices such as the computing device 500 illustrated in FIG. 5.

The item selector 170 may receive a query 115 from a user, and may determine one or more specified and unspecified attributes in the query 115. A specified attribute may be an attribute whose attribute value is part of the received query 115 or can be inferred from the query 115. For example, referring to Table 1, if the user provides the query 115 "RED SHOE", the attribute values "RED" and "SHOE" are attribute values for the specified attributes "TYPE" and "COLOR". An unspecified attribute may be an attribute whose attribute values are not part of the received query, but are part of the item data 155. Continuing the example above, the unspecified attributes for the query 115 "RED SHOE" are "SIZE" and "PRICE" because the use did not include any terms in the query 115 that are attribute values for either of the attributes "SIZE" or "PRICE".

The item selector 170 may determine the attributes in the query 115 using a variety of methods and techniques. In some implementations, the specified attributes may be determined using a technique that uses a log of previously received queries and the attributes and attribute values of the item data 155. For example, one or more terms of the previously received queries may be correlated with the attributes and attribute values of items that users who provided the queries purchased or otherwise showed interest in. The correlations of the query terms to the attribute and attribute values may be used to determine the attributes in the query 115.

The unspecified attributes may be determined by the item selector 170 based on the determined specified attributes and the remaining attributes of item data 155. In some implementations, the item selector 170 may determine items for the item data 155 that include the specified attributes. Attributes of the determined items that are not part of the determined specified attributes may be determined by the item selector 170 as the unspecified attributes.

Figure 2:
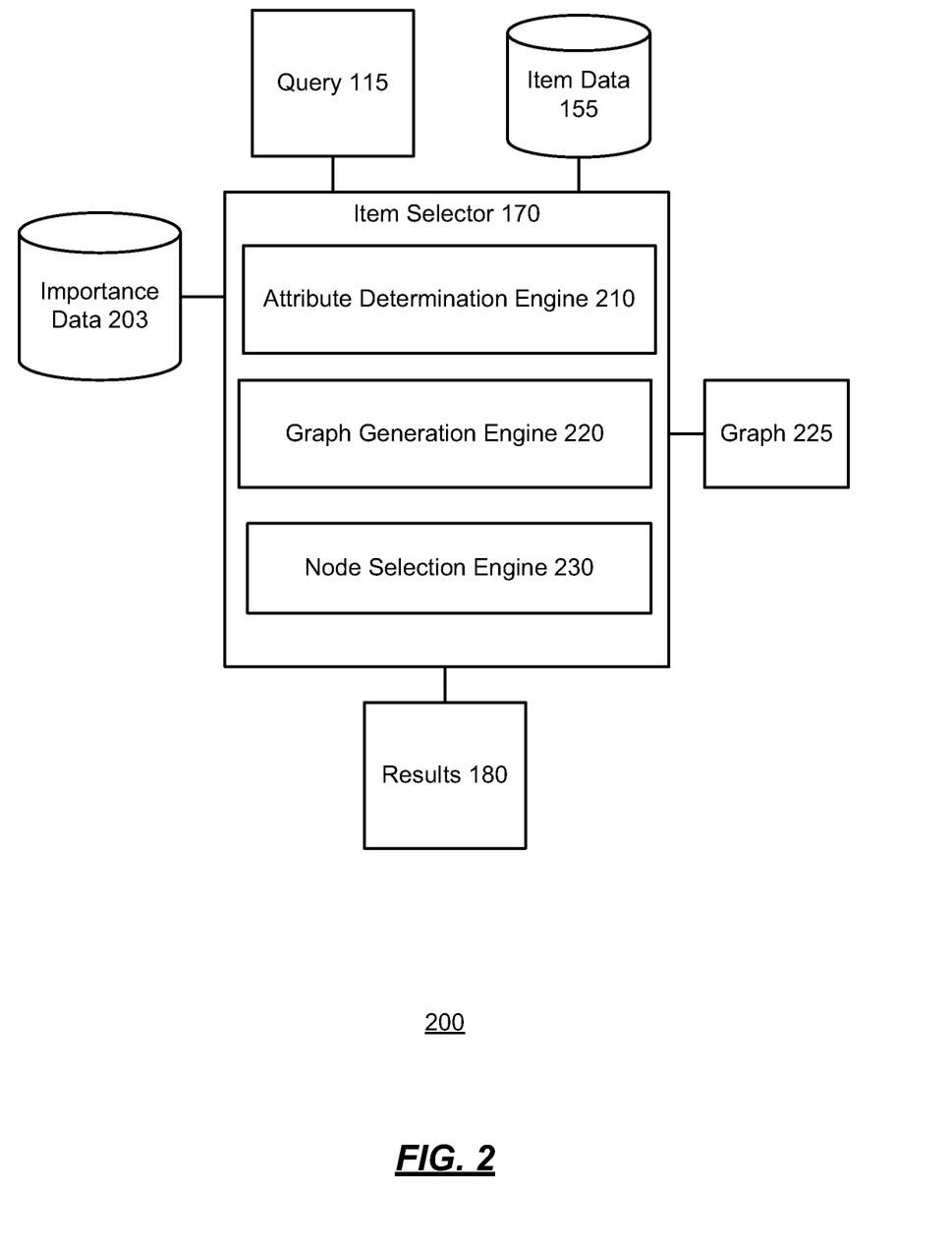
FIG. 2 is an illustration of an exemplary item selector.

As described further herein with respect to FIG. 2, the item selector 170 may select a subset of the items from the item data 155 in response to the query 115 based on specified attributes and unspecified attributes from the received query. In some implementations, the item selector 170 may select the items whose associated attributes have values that match, or approximately match, the values of the specified attributes from the query 115. In addition, the item selector 170 may also select the items whose associated attributes have attribute values that cover a diverse range of values with respect to the unspecified attributes of the query 115. By balancing the items identified in the results 180 to include items that both match the specified attributes and that are diverse with respect to the unspecified attributes, the search experience of a user may be improved.

FIG. 2 is an illustration of an exemplary item selector 170. The item selector 170 may include a variety of components including, but not limited to, an attribute determination engine 210, a graph generation engine 220, and a node selection engine 230. More or fewer components may also be supported.

The attribute determination engine 210 may receive a query 115, and may determine one or more specified attributes and unspecified attributes from the query 115. The query 115 may be received by the attribute determination engine 210 from a user via the provider 160.

In some implementations, the attribute determination engine 210 may determine the specified attributes from the query 115 using a correlation of the previously received query terms with the attribute and attribute values from the item data 155. For the unspecified attributes, the attribute determination engine 210 may determine items from the item data 155 that include the determined specified attributes. Attributes of the determined items that are not part of the determined specified attributes may be determined by the attribute determination engine 210 as the unspecified attributes.

The graph generation engine 220 may generate a graph 225 based on the items in the item data 155. The graph 225 may include a node for some or all of the items in the item data 155. The graph 225 may further include an edge between each unique node pair in the graph 225. Any one of a variety of graph generation techniques may be used by the graph generation engine 220 to generate the graph 225.

The graph generation engine 220 may generate and associate a cost with each of the nodes in the graph 225. The cost for a node may be a measure of the similarity of the attributes of the item associated with the node and the specified attributes determined from the received query 115. The cost for a node may based on a calculated distance between the values of the specified attributes and the values of the attributes of the items associated with the node that correspond to the specified attributes. Other similarity calculations may also be used.

The graph generation engine 220 may generate and associate a weight with each of the edges in the graph 225. The weight for an edge may also be a measure of the similarity of the items associated with each node in the node pair based on the attributes of the nodes corresponding to the unspecified attributes determined from the query 115. The weight for an edge may based on a calculated distance between the values of the unspecified attributes and the values of the attributes of the items associated with the nodes connected by the edge that correspond to the unspecified attributes. Other similarity calculations may also be used.

In some implementations, the distance function used by the graph generation engine 220 may calculate a distance between two attribute values for an underlying attribute based on a likelihood that a user would select one of the attribute values versus the other attribute value. The likelihood may be determined based on data collected by the provider 160 from previously received user queries 115, for example. In addition, the distance function may also take into account a relative importance of attribute values and the importance of the underlying attributes. The importance of the attribute and attribute values may be represented as an importance data 203. The importance data 203 may be based on previously received queries 115, or may be specified or set by a user or administrator, for example.

The node selection engine 230 may select a subset of the nodes from the graph 225. In some implementations, the node selection engine 230 may select the nodes using a formula that minimizes the total cost of the nodes while maximizing a dispersion of the selected nodes, where the dispersion is based on the weights of edges between the selected nodes. The total cost of the nodes in the subset may be minimized, or alternatively kept below a predetermined budget. The budget may be set by a user or administrator. The dispersion of the nodes may be a max-min dispersion or a max-sum dispersion, for example.

In an implementation, the node selection engine 230 may select a subset of nodes from the graph 225 by solving the following linear programming relaxation LP where V is all the nodes in the graph 225, $d(u,v)$ is the weight of an edge $x_{uv}$ between two nodes u and v, $\lambda$ is a constant, $c(v)$ is the cost of the node v, and each $y_v$ is a variable denoting that the node v has been selected for the subset of nodes:

$$\text{Maximize } \Sigma_{u,v \in V} d(u, v) x_{uv} - \lambda \Sigma_{v \in V} c(v) y_v \quad \text{(LP)}$$

As illustrated, solving the relaxation LP may result in the selection of a subset of nodes that maximizes the difference between the sum of the weights of the edges between the nodes (i.e. $\Sigma_{u,v \in V} d(u, v) x_{uv}$) and the sum of the costs of the nodes in the subset (i.e., $\lambda \Sigma_{v \in V} c(v) y_v$). By increasing or decreasing the constant A the relative importance of the costs of the nodes versus the dispersion of the weights of the nodes in the selection of the subset may be adjusted.

In some implementations, the node selection engine 230 may solve the LP relaxation to select the subset of nodes, using what is referred to herein as the "greedy" algorithm. For the greedy algorithm, the cost function used by the graph generation engine 220 is constrained to assign costs from a set of K different values to the nodes in the graph 225. The nodes V of the graph 225 may then be partitioned in to K subsets of nodes (denoted as $V_1, V_2, V_3, \ldots V_K$) where each node in the subset has the same associated cost. A vector W (where $\vec{W} = (W_1, W_2, W_3, \ldots W_K)$) may be a vector whose $i^{th}$ entry denotes the number of nodes from the bucket $V_i$ selected from the graph 225 for an optimal subset of nodes.

The greedy algorithm may be executed by the node selection engine 230 according to the following pseudo-code, where G is the graph 225 and S is the selected subset of nodes:

Initialize S → ∅.
While ($\vec{W}$ is not the NULL vector)
  Select the edge (u, v) ∈ G with the greatest weight that does not violate $\vec{W}$.
    Let u ∈ $V_i$, v ∈ $V_j$.
    Set $w_i \leftarrow w_i - 1$, and $w_j \leftarrow w_j - 1$.
    Delete the nodes u, v from the Graph G.
Return S.

As shown, the greedy algorithm at each iteration selects the edge for S with the greatest weight that does not violate $\vec{W}$, and adds the nodes u and v corresponding to the selected edge to S. The entries in $\vec{W}$ corresponding to each of the nodes u and v of the selected edge are decremented. An edge violates $\vec{W}$ if the entry in $\vec{W}$ corresponding to either of the nodes u and v of the edge is zero. The greedy algorithm continues to select edges until each entry in $\vec{W}$ is zero.

In some implementations, the node selection engine 230 may improve the performance of the node selection by first computing a pareto-frontier based on the items associated with the nodes before selecting the subset of nodes. The pareto-frontier is a subset of the nodes from the graph 225 that represent items from the item data 155 that strictly dominate the items not associated with items in the subset based on the attributes associated with the items. For example, where the items are products, a "$350 10 MP Nikon Camera" may strictly dominate a "$450 8 MP Nikon Camera" because users generally do not prefer products with higher prices and lesser features. Thus, a node representing the "$350 10 MP Nikon Camera" may be selected for the pareto-frontier over a node representing the "$450 8 MP Nikon Camera". Because items associated with the nodes in the pareto-frontier strictly dominate items not associated with nodes in the pareto-frontier, the node selection engine 230 may select the nodes for the subset of nodes from the nodes corresponding to the items in the pareto-frontier only, rather than the entirety of the graph 225. Any one of a variety of heuristics known in the art for computing the pareto-frontier may be used.

The item selector 170 may select items corresponding to the nodes in the subset of nodes selected by the node selection engine 230. The item selector 170 may provide identifiers of the selected items to a user who provided the query 115 as the results 180.

Figure 3:
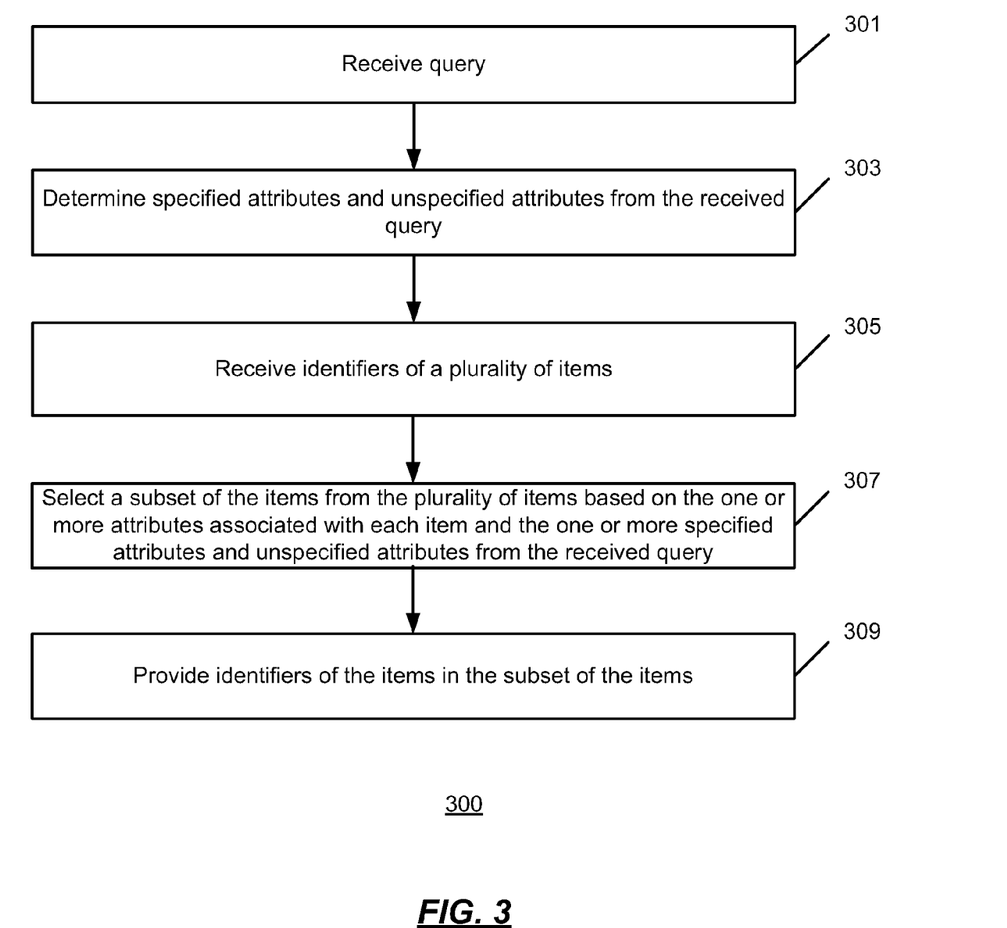
FIG. 3 is an illustration of an exemplary process for recommending items in response to a query based on specified and unspecified attributes from the query.

FIG. 3 is an illustration of an exemplary process 300 for recommending items in response to a query based on specified and unspecified attributes from the query. The process 300 may be implemented by the item selector 170 of the provider 160, for example.

A query is received at 301. The query 115 may be received from a user of a client device 110 by the provider 160. The user may be searching for one or more consumer products or services, for example.

One or more specified and unspecified attributes are determined from the received query at 303. The one or more specified and unspecified attributes may be determined by the attribute determination engine 210 of the item selector 170. The specified attributes may be attributes that correspond to one or more attribute values that are directly or indirectly part of the query 115. The unspecified attributes may be attributes that correspond to attributes that are associated with one or more items, but that were not directly or indirectly part of the received query 115.

Identifiers of a plurality of items are received at 305. The identifiers may be received by the item selector 170. The identifiers may identify items from the item data 155. In some implementations, the items may be represented in the item data 155 as structured data tuples, and each structured data tuple may have one or more attributes. For example, the items may represent commercial products, and each structured data tuple representing a commercial product may have attributes corresponding to features or characteristics of the commercial product.

A subset of the items is selected from the plurality of items at 307. The subset of the items may be selected by the item selector 170 based on the one or more attributes associated with each item and the one or more specified and unspecified attributes from the received query. In some implementations, the subset of items may be selected using a function that selects items with attribute values of attributes that match attribute values of the specified attributes, while also selecting items having a broad range of attribute values with respect to the unspecified attributes.

In some implementations, the item selector 170 may generate a graph with nodes that represent the items in the item data 155, and edges between each unique pair of nodes. Each node may be associated with a cost based on a distance between the attributes of the item represented by the node and the specified attributes. Each edge may be associated with a weight based on a distance between the attributes of the items represented by the nodes connected by the edge and the unspecified attributes. The item selector 170 may then select nodes from the graph whose cost is less than a specified budget and whose total weight with respect to the edges connecting the selected nodes is maximized. In some implementations, the item selector 170 may select the nodes using the greedy algorithm described with respect to FIG. 2. The items corresponding to the selected nodes may be selected for the subset.

Identifiers of the items in subset of items are provided at 309. The identifiers of the items may be provided by the item selector 170 to the computing device 110 associated with the user who provided the query 115. The identifiers of the items may be provided in a webpage as part of the results 180, for example.

Figure 4:
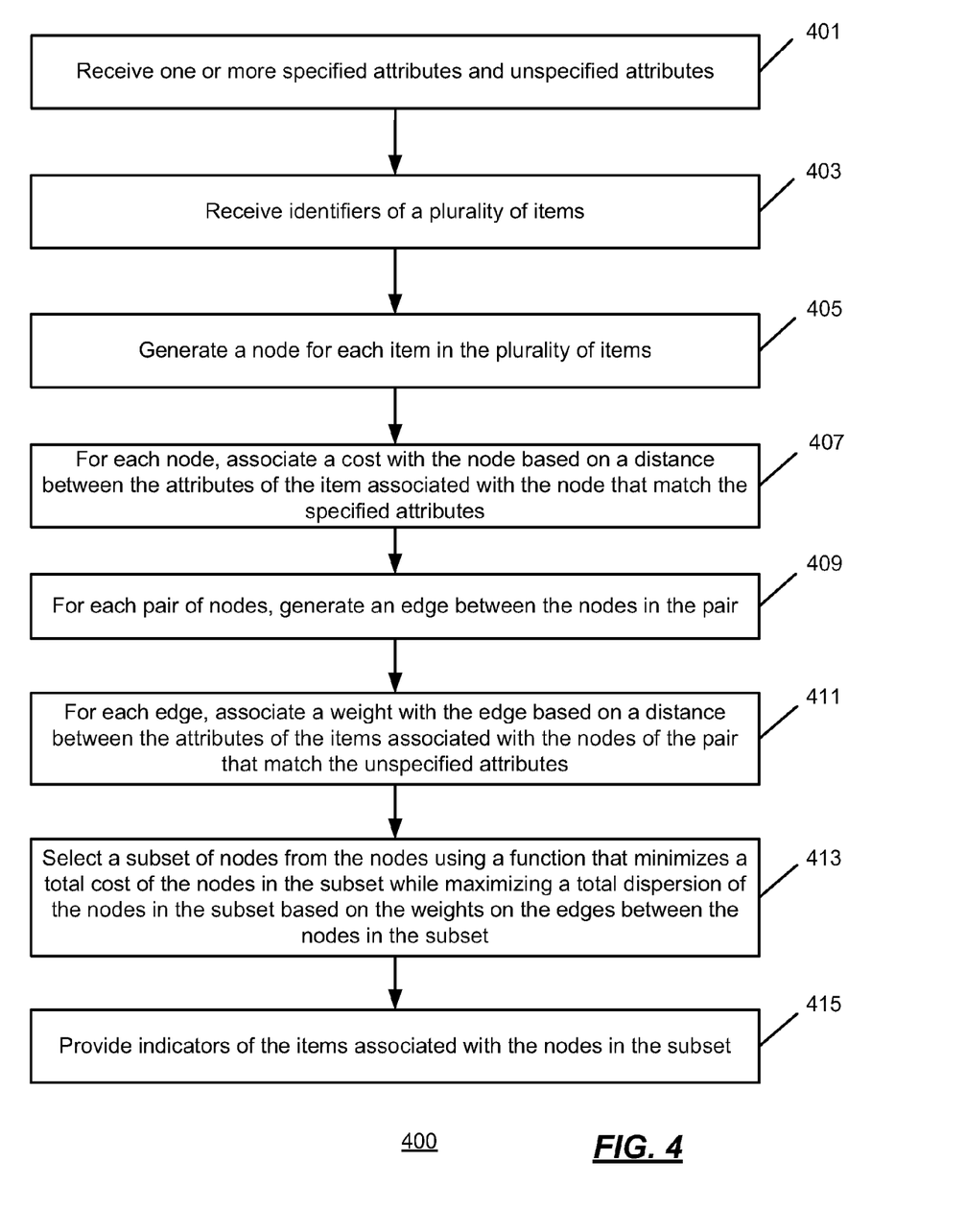
FIG. 4 is an illustration of an exemplary process for recommending items based on specified and unspecified attributes from a query.

FIG. 4 is an illustration of an exemplary process 400 for recommending items based on specified and unspecified attributes from a query. The process 400 may be implemented by the item selector 170 of the provider 160, for example.

One or more specified attributes and unspecified attributes are received at 401. The specified and unspecified attributes may be associated with a query 115 and may be received by the graph generation engine 220 from the attribute determination engine 210 of the item selector 170.

Identifiers of a plurality of items are received at 403. The identifiers may be received by the graph generation engine 220 from the item data 155. The identified items may represent consumer products, for example, and each item may have one or more associated attributes.

A node is generated for each item in the plurality of items at 405. The nodes may be generated by the graph generation engine 220 and may be generated as part of a graph 225.

A cost is associated with each node at 407. A cost may be associated with each node by the graph generation engine 220 and may be based on a distance between the attributes of the item associated with the node that match the specified attributes. Any method of technique for determining a distance between attributes may be used.

For each pair of nodes, an edge is generated between the nodes in the pair at 409. Each edge may be generated by the graph generation engine 220 and added to the graph 225.

A weight is associated with each edge at 411. Each weight may be associated with an edge by the graph generation engine 220 and may be based on a distance between the attributes of the items associated with the nodes of the pair associated with the edge that match the unspecified attributes.

A subset of the nodes is selected at 413. The subset of nodes may be selected by the node selection engine 230 using a function that minimizes a total cost of the nodes in the subset while maximizing a total dispersion of the nodes in the subset based on the weights on the edges between the nodes in the subset. Alternatively or additionally, the function may keep the total cost of the nodes in the subset below a predetermined budget. The dispersion of the nodes may be measured using a max-min dispersion calculation or a max-sum dispersion calculation, for example. In implementations where a pareto-frontier is generated for the plurality of items, the subset of nodes may be selected from the nodes corresponding to the items in the pareto-frontier.

Indicators of the items associated with the nodes in the subset are provided at 415. The indicators of the items associated with the nodes in the subset may be provided by the item selector 170 to a user who provided the initial query 115 in a webpage as the results 180.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 600.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving identifiers of a plurality of items by a computing device, wherein each item is associated with one or more attributes;
   receiving a query at the computing device;
   determining one or more specified attributes of the received query using a correlation of terms of a plurality of previously received queries and attributes associated with the items of the plurality of items by the computing device;
   determining one or more items from the plurality of items that are associated with attributes that include the determined one or more specified attributes by the computing device;
   determining one or more attributes associated with the determined one or more items that are not part of the determined one or more specified attributes as one or more unspecified attributes of the received query by the computing device;
   selecting a subset of the items from the plurality of items based on the one or more attributes associated with each item and the one or more specified attributes and unspecified attributes from the received query by the computing device by:
     for each item in the plurality of items, associating a cost with the item based on a distance between the attributes of the item that match the one or more specified attributes from the received query;
     for each pair of items of the plurality of items, associating a weight with the pair based on a distance between the attributes of the items of the pair of items that match the one or more unspecified attributes from the received query; and
     selecting the subset of items from the plurality of items using a function that minimizes a total cost of the costs associated with the items in the subset while maximizing a total weight of the weights associated with the pairs of items in the subset; and
   providing identifiers of the items in the subset of the items by the computing device.

2. The method of claim 1, wherein the items comprise consumer products.

3. The method of claim 1, wherein the function comprises a greedy algorithm.

4. The method of claim 1, wherein each attribute has an associated attribute value, and further wherein the distance between the attributes of the item that match the specified attributes from the received query is determined based on an importance of the attributes of the item, and an importance of one or more attribute values associated with the attributes of the item.

5. The method of claim 1, further comprising:
   determining a pareto-frontier of the plurality items; and
   selecting the subset of items from the determined pareto-frontier.

6. A method comprising:
   receiving identifiers of a plurality of items at a computing device, wherein each item is associated with one or more attributes;
   determining one or more specified attributes of a query using a correlation of terms of a plurality of other queries and attributes associated with the items of the plurality of items by the computing device;

determining one or more items from the plurality of items that are associated with attributes that include the determined one or more specified attributes by the computing device;

determining one or more attributes associated with the determined one or more items that are not part of the determined one or more specified attributes as one or more unspecified attributes of the query by the computing device;

generating a node for each item in the plurality of items by the computing device;

for each node, associating a cost with the node based on a distance between the attributes of the item associated with the node that match the specified attributes;

for each pair of nodes, generating an edge between the nodes in the pair of nodes;

for each edge, associating a weight with the edge based on a distance between the attributes of the items associated with each node of the pair of nodes corresponding to the edge that match the unspecified attributes;

selecting a subset of nodes from the nodes using a function that minimizes the total cost of the nodes in the subset while maximizing a total dispersion of the nodes in the subset based on the weights associated with the edges between the nodes in the subset; and providing indicators of the items corresponding to the items associated with the nodes in the selected subset.

7. The method of claim 6, wherein the items comprise consumer products.

8. The method of claim 6, wherein the total dispersion is determined using one of a max-min dispersion or a max-sum dispersion.

9. The method of claim 6, wherein the function that minimizes the total cost of the nodes in the subset while maximizing a total dispersion of the nodes in the subset based on the edge weights between the nodes in the subset comprises a greedy algorithm.

10. The method of claim 6, wherein each attribute has an associated attribute value, and further wherein the distance between the attributes of the item that match the specified attributes is determined based on an importance of the attributes of the item, and an importance of one or more attribute values associated with the attributes of the item.

11. The method of claim 6, further comprising:
determining a pareto-frontier from the plurality of items;
selecting the subset of nodes from nodes associated with one or more items from the determined pareto-frontier.

12. A system comprising:
at least one computing device;
an attribute determination engine adapted to:
receive a query;
determine one or more specified attributes of the received query using a correlation of terms of a plurality of previously received queries and attributes associated with items of a plurality of items;
determine one or more items from the plurality of items that are associated with attributes that include the determined one or more specified attributes; and
determine one or more attributes associated with the determined one or more items that are not part of the determined one or more specified attributes as one or more unspecified attributes of the received query; and
an item selector adapted to:
receive identifiers of the plurality of items;
select a subset of the items from the plurality of items based on the one or more attributes associated with each item and the one or more specified attributes and unspecified attributes from the received query by:
for each item in the plurality of items, associating a cost with the item based on a distance between the attributes of the item that match the one or more specified attributes from the received query;
for each pair of items of the plurality of items, associating a weight with the pair based on a distance between the attributes of the items of the pair of items that match the one or more unspecified attributes from the received query; and
selecting the subset of items from the plurality of items using a function that minimizes a total cost of the costs associated with the items in the subset while maximizing a total weight of the weights associated with the pairs of items in the subset; and
provide identifiers of the items in the subset of the items 13. The system of claim 12, wherein the function comprises a greedy algorithm.

14. The system of claim 12, wherein each attribute has an associated attribute value, and further wherein the distance between the attributes of the item that match the specified attributes from the received query is determined based on an importance of the attributes of the item, and an importance of one or more attribute values associated with the attributes of the item.

15. The system of claim 12, wherein the items comprise consumer products.

* * * * *